United States Patent Office 3,637,548
Patented Jan. 25, 1972

3,637,548
MELAMINE MOLDING COMPOSITION
Norman W. Standish, Shaker Heights, and Richard W. Yanik, North Randall, Ohio, assignors to The Standard Oil Company, Cleveland, Ohio
No Drawing. Filed Apr. 24, 1970, Ser. No. 31,734
Int. Cl. C08g 51/18
U.S. Cl. 260—17.3                                              10 Claims

ABSTRACT OF THE DISCLOSURE

A process for producing an improved melamine-formaldehyde molding composition and molded articles therefrom comprises incorporating into the standard melamine-formaldehyde "popcorn" or molding powder from about 1 to 50 percent by weight of a cured, pulverized melamine-formaldehyde polymer composition based on the total weight of the molding powder formulation.

This invention relates to a novel process for producing an improved melamine molding composition and to the preparation of molded articles therefrom. More particularly this invention relates to the preparation of a melamine-formaldehyde molding powder by incorporating therein certain amounts of a pulverized, thermoset melamine-formaldehyde polymer composition of a specific particle size.

Essentially the process of this invention produces a melamine-formaldehyde molding composition in which a certain portion of the molding powder has been subjected to a two-stage cure. One of the main advantages associated with this invention is that waste materials from melamine-aldehyde molding operations, such as flash, and burned tablets resulting from exposure of the molding powder to temperatures high enough to effect a cure in the absence of pressure, can be reclaimed and used in the process. The molding powder prepared according to the teachings of this invention can be formed into desired plastic articles by compression molding or by injection molding and the molded articles thus formed exhibit superior physical properties compared with those obtained from standard melamine-formaldehyde molding formulations.

The molding composition of this invention is particularly useful in the manufacture of molded dinnerware, however, the composition is also useful for the manufacture of electrical components and other household utensils. The molded articles obtained by the process described exhibits substantial improvement in flexural strengths and discernible increases in flexural modulus, notched Izod impact, hardness and scratch resistance as compared with molded articles prepared from standard melamine molding resin formulations. The improvement in physical properties realized by this invention substantiates the theory that the thermoset (or cured) melamine-formaldehyde composition in admixture with the standard melamine-formaldehyde molding powder functions as a reactive filler, whereas inert fillers, such as clay, act only as diluents and usually have a deleterious effect on the physical properties of the molding composition.

The active thermoset melamine-formaldehyde filler employed in the molding powder formulation contains the usual amounts of a fibrous filler such as clay, asbestos, paper and preferably alpha-cellulose. Optionally mold releasing agents, curing catalysts and polymerization inhibitors normally utilized in molding powder formulations may also be present.

A satisfactory molding composition can be prepared in accordance with this invention by adding the pulverized, cured melamine-formaldehyde composition to standard melamine-formaldehyde molding powder or "popcorn" in concentrations ranging from about 1 to 50 percent by weight based on the total weight of the ultimate molding powder composition. The upper concentration is governed by the flow properties of the molding powder blend, since the tendency to flow decreases with increasing concentration of the added cured (or thermoset) composition. The preferred concentration therefor ranges from about 10 to 35 percent by weight based on the total weight of the molding powder formulation.

The flow properties of the molding powder can be adjusted and the preforming properties can be improved by incorporating into the formulation minor amounts of certain well-known lubricants such as water, zinc stearate, fatty acid amides, silicones and the like. It is particularly advantageous to add a lubricant to the molding powder in concentration of up to about 4 percent by weight of the molding powder composition while concentrations exceeding 4 percent generally have an adverse affect on gloss of the molded article.

The amount of catalyst employed in the overall formulation in this invention is proportionately less than that normally present in the standard melamine-formaldehyde molding powder, since it is not essential to add additional catalyst to compensate for the active thermoset melamine filler blended with the standard molding powder. In fact where the thermoset filler is added to "popcorn" it is not essential to add any catalyst to the formulation since the cure time in the molding operation can be adjusted to compensate for the lack of catalyst present.

Particle size of the thermoset melamine-formaldehyde filler is an important factor in the present formulation and satisfactory molded articles are obtained when 100 percent of the thermoset plastic component to be added to the molding powder is ground to a particle size of less than 250 microns. This corresponds to the material passing through a number 60 U.S. sieve screen or a 60 mesh Tyler sieve screen.

The active thermoset melamine-formaldehyde filler of this invention can be advantageously blended with other molding powder systems such as phenolic and urea-type molding powders with similar beneficial results.

In preparing the melamine-formaldehyde molding powder of this invention a commercial aqueous solution of formaldehyde containing 37 percent formaldehyde by weight is reacted with melamine in a molar ratio of about 1:1 to 3:1. The mixture is stirred and the pH of the mixture is adjusted to between 8 to 10 with a base such as sodium hydroxide or ammonium hydroxide. The mixture is heated to reflux until a syrup is formed.

The molding compound is prepared from this syrup by adding a conventional filler such as clay, asbestos, paper, fiber, etc., and preferably alpha-cellulose in amounts ranging from 20 to 70 parts per 100 parts of resin. After thorough blending the impregnated filler is dried and conventional pigments, curing catalysts, mold-release agents, and brighteners are added.

The drying step is accomplished in a continuous-type oven where the impregnated filler travels through an oven on a belt and is contacted with hot air at about 170° to 210° F. to remove moisture. The resin is obtained from the oven in a coarse granular form referred to as "popcorn." The "popcorn" granules are reduced in size by passing through a pre-grinder. To this finely granulated material may be added the desired amount of pulverized, thermoset melamine-formaldehyde filler.

The thermoset melamine-formaldehyde filler is prepared in the same manner as the molding powder heretofor described with the exception that the thermoset composition is obtained by subjecting the melamine-formaldehyde molding powder to higher temperatures or to a longer period of heat treatment so that sufficient cross-linking occurs to transform the molding powder into a non-thermoplastic composition. Although the temperature and the duration of the heat treatment are interdependent, to insure non-thermoplasticity of the melamine-formaldehyde polymer filler it is essential to subject the polymer to a temperature of at least 210° F., for a minimum period of 90 minutes and not over a maximum temperature of 375° F. for 3 minutes in the absence of pressure.

In the event that waste materials derived from the molding operation are utilized as fillers the filler is obtained by initially converting the molding powder into a tablet by cold stamping and then preheating the tablet to temperatures in excess of 280° F. for a period of one minute prior to molding. Considerable cross-linking of the polymer occurs in the pre-heating step so that the tablet, and in particular those that are unsuitable for compression molding due to overheating or burning, may then be ground to the desired particle size and incorporated into the melamine-formaldehyde ground "popcorn" or molding powder substrate in appropriate amounts.

In normal operation the cold-stamped, pre-heated tablets are subsequently molded into plastic articles at elevated temperatures and pressures, during which time further cross-linking of the melamine-formaldehyde polymer occurs. Molded articles that are rejected because of imperfections or flash obtained from such molding operations may be ground to the appropriate particle size and advantageously incorporated into standard melamine-formaldehyde "popcorn" or molding powder.

The ground, thermoset filler thus obtained may be uniformly dispersed and blended into the "popcorn" or molding powder substrate by any suitable means such as hand mixing, ball milling, high-speed mixing as in Prodex Henschel Mixer, air fluidizing etc. Ball milling, which is frequently used, is carried out in a rotatable drum-like apparatus which contains flint or porcelain balls of the same or varying diameters. The ground product is then molded into various shapes by subjecting the preformed tablet to compression molding at temperatures of from 250° to 375° F. and pressures of from 1400 to 4000 p.s.i. for a period of 0.5 to 10 minutes or by injection molding at temperatures of from about 250° to 370° F. for a closed clamp time of from about 50 seconds to 3 minutes.

In order that the present invention may be more completely understood, the following examples illustrate in greater detail the various steps of the process. These examples, however, are set forth primarily for the purpose of illustration and are not to be interpreted as limitations of the invention.

EXAMPLE 1

(A) Preparation of "popcorn."—126 parts (1.0 mole) of melamine and 178 parts (2.2 moles) of 37 percent aqueous formaldehyde solution were introduced into a reactor vessel equipped with a reflux condenser, thermometer and stirrer. The mixture was stirred for about 5 minutes to break up any aggregated material, and the pH adjusted to 8.5–9 (glass electrode at 25° C.) using a one-normal solution of sodium hydroxide. The reaction mixture was heated to reflux in 15 minutes and reflux was continued until one drop of the resin hydrophobed in 25 cc. of water (25° C.) and the Ford Cup viscosity was about 25 seconds. The resin was then cooled to 70° C.

The resin syrup (63 percent solids) and 94 parts by weight of alpha-cellulose pulp flock were mixed thoroughly in a Sigma Blade Mixer for 45 minutes. The cellulose-resin mixture was dried in an air stream for 1 hour at 190° F. and 18 percent relative humidity. The ground "popcorn" was then compression molded at 310° F. at a pressure of 1400 p.s.i. for a period of 5 minutes.

EXAMPLE 2

(A) Preparation of reactive filler.—Standard melamine molding powder was prepared according to the procedure described in Example 1 by adding to 100 parts by weight of the dry resin "popcorn," 0.20 part phthalic anhydride, 0.5 part zinc stearate and 0.5 part of rutile titanium dioxide. The melamine-formaldehyde molding powder thus prepared was compression molded at a temperature of 345° F. and a pressure of 2000 p.s.i. for a period of three minutes to obtain a cured, cross-linked plastic material. The thermoset polymer thus obtained was ground to a particle size below 100 microns on a rotary turbine-type mill using a 0.5 mm. on size screen.

(B) Preparation of molding powder.—25 parts by weight of reactive filler prepared in Part A were blended with 75 parts by weight of melamine-formaldehyde ground "popcorn" from Example 1 by hand mixing for a period of about 3 minutes. The resulting molding powder was compression molded at 310° F. at a pressure of 1400 p.s.i. for a period of 5 minutes.

EXAMPLE 3

The procedure of Example 2 was repeated except that 65 parts by weight of the standard melamine-formaldehyde "popcorn" prepared as in Example 1 were mixed with 35 parts by weight of the reactive filler prepared as in Part A of Example 2.

EXAMPLE 4

The procedure of Example 2 was repeated except that 0.3 percent by weight of carbon black based on the weight of the final molding powder formulation were added to the molding powder, and the ground standard melamine-formaldehyde "popcorn" and reactive filler were combined by mixing in a Prodex Henschel Mixer.

EXAMPLE 5

The procedure of Example 4 was repeated except that the "popcorn" and the reactive filler were mixed in a ball mill for 8 hours.

EXAMPLE 6

Preparation of molding powder.—126 parts (1.0 mole) of melamine and 178 parts (2.2 moles) of 37 percent aqueous formaldehyde solution were introduced into a reactor vessel equipped with a reflux condenser, thermometer and stirrer. The mixture was stirred for about 5 minutes to break up any aggregated material, and the pH adjusted to 8.5–9 (glass electrode at 25° C.) using a one-normal solution of sodium hydroxide. The reaction mixture was heated to reflux in 15 minutes and reflux was continued until one drop of the resin hydrophobed in 35 cc. of water (25° C.) and the Ford Cup viscosity was about 25 seconds. The resin was then cooled to 70° C.

The resin syrup (63 percent solids) and 94 parts of alpha-cellulose pulp flock were mixed thoroughly in a Sigma Blade Mixer for 45 minutes. The cellulose-resin mixture was dried in an air stream for one hour at 190° F. and 18 percent relative humidity. The resulting dry resin (100 parts) was ground in a ball mill with 0.20 part phthalic anhydride, 0.5 part of zinc stearate, 0.5 part of rutile titanium dioxide for eight hours. The molding powder thus obtained was compression molded at 310° F. at a pressure of 1400 p.s.i. for a period of 3 minutes.

EXAMPLE 7

(A) Preparation of reactive filler.—126 parts (1.0 mole) of melamine and 178 parts (2.2 moles) of 37 percent aqueous formaldehyde solution were introduced into a reactor vessel equipped with a reflux condenser, thermometer and stirrer. The mixture was stirred for about 5 minutes to break up any aggregated material, and the pH adjusted to 8.5-9 (glass electrode at 25° C.) using a one-normal solution of sodium hydroxide. The reaction mixture was heated to reflux in 15 minutes and reflux was continued until one drop of the resin hydrophobed in 35 cc. of water (25° C.) and the Ford Cup viscosity was about 25 seconds. The resin was then cooled to 70° C.

The resin syrup (63 percent solids) and 94 parts of alpha-cellulose pulp flock were mixed thoroughly in a Sigma Blade Mixer for 45 minutes. The cellulose-resin mixture was dried in an air stream for 4 hours at 190° F. and 4 percent relative humidity. 100 parts of the resulting dry resin were ground in a ball mill with 0.20 part phthalic anhydride, and 0.5 part of zinc stearate for a period of 5 hours. The molding powder thus obtained was formed into a tablet by stamping and then was heated sufficiently to induce cross-linking by the tablet passing between the plates of a radio-frequency heater with a 2.7 grid voltage and a residence time of 60 seconds. The tablet was then cooled and ground in a rotary turbine-type mill using a 0.5 mm. size screen to produce a pulverized product with a particle size 100 percent of which was below 100 microns.

(B) Preparation of molding powder.—75 parts by weight of standard molding powder of Example 6 were blended with 25 parts by weight of a reactive filler prepared as in Part A by hand mixing. The resulting molding powder was compression molded at 310° F. at a pressure of 1400 p.s.i. for a period of 3 minutes.

EXAMPLE 8

75 parts by weight of the standard molding powder of Example 6 were added and mixed by hand with 25 parts by weight of a reactive filler prepared as in Example 2, Part A. The molding powder was compression molded under the same conditions as in Example 6.

EXAMPLE 9

The procedure of Example 7 was repeated except that 50 parts by weight of standard molding powder were mixed with 50 parts by weight of the reactive filler.

EXAMPLE 10

The procedure of Example 7 was repeated except that 25 parts by weight of standard molding powder were mixed with 75 parts by weight of the reactive filler.

EXAMPLE 11

The procedure of Example 7 was repeated except that 0.3 percent by weight of carbon black based on the weight of the final molding powder formulation was added to the molding powder composition and the molding powder and reactive filler were blended in a ball mill.

EXAMPLE 12

(A) Preparation of molding powder.—756 parts (6 moles) of melamine and 1,362 parts (16 moles) of 37 percent aqueous formaldehyde solution were introduced into a reaction vessel equipped with a reflux condenser, thermometer, and stirrer. The mixture was stirred for several minutes to break up aggregated material and to form a uniform dispersion of melamine throughout the mixture. The pH of the mixture was adjusted to 8.0 (glass electrode at 25° C.) using 1 N sodium hydroxide. The reaction mixture was then heated to reflux and reflux continued until one drop of the clean resin hydrophobed (Encyclopedia of Polymer Science and Technology, volume 2, page 30) in 25 cc. of water (25° C.). The resin was cooled, added to 582 grams of alpha-cellulose and mixed by hand until no free resin syrup remained. The product was then mixed in a Sigma Blade Mixer for a period of one hour.

The alpha-cellulose resin mixture was dried in an air stream for one hour at 190° F. at 18 percent relative humidity. The resulting dried product was ground on a screen mill to produce a powder in which the maximum particle size was less than 800 microns.

(B) To 75 parts of the molding powder prepared in part (A) were added 0.5 part of zinc stearate, 0.5 part of rutile titanium dioxide, 0.13 percent phthalic anhydride and 25 parts of ground reactive filler prepared as in Example 2(A) and the mixture was charged to a mill and milled for one hour. At this point 0.3 gram of carbon black were blended into the mixture. At the end of one hour of milling, 2 parts of water were sprayed into the mill avoiding concentrated area of water which would result in lumps. Milling was continued for four hours. This resin was then molded at a pressure of 3,000 p.s.i. and at a temperature of 175° C. for a period of three minutes to produce a molded part with excellent surface gloss. The Rossi Peak flow measurement gave a 35 percent increase in flow over powder with no added water.

EXAMPLE 13

(A) The preparation of the ground "popcorn" was the same as that in Example 12, part (A).

(B) To the ground "popcorn" of part (A) were added 0.5 part of zinc stearate, 0.5 part of rutile titanium dioxide and sufficient reactive filler prepared as in Example 2, part (A) so that the final molding powder composition consisted of a blend of equal parts of the transfer grade molding powder from part (A) and of reactive filler. The mixture was milled in a ball mill for five hours. The resin was molded using a transfer mold at a pressure of 3,000 p.s.i. and temperature of 175° C. for a period of five minutes.

The physical properties of the products obtained in Examples 1 to 11 are summarized in Table I. The properties shown were measured by the standard ASTM test procedures designated under the column headings in the table. The data in this table illustrate the improvements obtained in the physical properties, particularly in the flexural strength, of the molded melamine-formaldehyde polymer composition with the addition of active, thermoset melamine-formaldehyde filler to the standard "popcorn" or to the standard molding powder substrate.

TABLE I.—PHYSICAL PROPERTIES OF MOLDED ARTICLES

| Ex. | Material composition | Method of mixing | Flex strength (p.s.i.×10³) | Flex modulus (p.s.i.×10⁵) | Notched Izod, ft.-lbs./in. of notch | Rockwell "M" hardness | Grams Princeton "Passed" | Grams Scratch "Failed" |
|---|---|---|---|---|---|---|---|---|
| | ASTM test procedure | | D790 | D790 | D256 | D1505 | | |
| (1) | 100% ground melamine-formald. "Popcorn." | | 15.9 | 14.3 | 0.21 | 121 | 225 | 250 |
| (2) | 75% ground melamine-formald. "Popcorn"; 25% ground flash. | By hand | 20.0 | 14.1 | 0.22 | 123 | 200 | 225 |
| (3) | 65% ground melamine-formald. "Popcorn"; 35% ground flash. | do | 20.6 | 14.2 | 0.24 | 123 | 200 | 225 |
| (4) | 75% ground melamine-formald. "Popcorn"; 25% ground flash; 0.3% carbon black. | Prodex-Henschel mixer | 17.9 | 12.8 | 0.24 | 120 | 125 | 150 |
| (5) | 75% ground melamine-formald. "Popcorn"; 25% ground flash; 0.3% carbon black. | Ball mill | 17.6 | 12.9 | 0.19 | 122 | 250 | 275 |
| (6) | 100% melamine-formald. mold. powd. | | 10.7 | 11.6 | 0.18 | 117 | 225 | 250 |
| (7) | 75% melamine-formald. mold. powd.; 25% ground-cured tablets. | By hand | 16.1 | 12.6 | 0.18 | 118 | 200 | 225 |
| (8) | 75% melamine-formald. mold. powd.; 25% ground flash. | do | 16.5 | 12.9 | 0.23 | 120 | 250 | 275 |
| (9) | 50% melamine-formald. mold. powd.; 50% ground-cured tablets. | do | 15.5 | 12.9 | 0.18 | 119 | 175 | 200 |
| (10) | 25% melamine-formald. mold. powd.; 75% ground-cured tablets. | do | 17.1 | 13.5 | 0.16 | 121 | 150 | 175 |
| (11) | 75% melamine-formald. mold. powd.; 25% ground-cured tablets; 0.3 carbon black. | Ball mill | 15.9 | 12.7 | 0.18 | 121 | 275 | 300 |

We claim:
1. A process for preparing an improved molding composition comprising:
  (A) combining a fibrous filler with a resinous syrup of a condensate of formaldehyde and melamine;
  (B) drying the combined material from (A); and
  (C) adding and homogenizing with the dried material of (B) from about 1 to 50 percent by weight, based on the total weight of the molding composition, of a composition prepared by the steps of:
    (a) combining a fibrous filler with a resinous syrup of a condensate of formaldehyde and melamine,
    (b) drying the combined material from (a),
    (c) curing at an elevated temperature and pulverizing the composition obtained from (b).

2. The process in claim 1 wherein the composition in step (c) is cured by heating to a temperature of at least 210° F. for a period of 90 minutes and not exceeding a temperature of 375° F. for a period of 3 minutes.

3. The process of claim 1 wherein the composition in step (c) is cured by molding at a temperature from about 250° to 375° F. and at a pressure of from about 1400 to 4000 p.s.i.

4. The process of claim 3 wherein the cured composition in step (c) is ground to a particle size of less than 250 microns.

5. The molding composition obtained by the process of claim 1.

6. The molding composition obtained by the process in claim 4.

7. The molded article obtained by:
  (A) combining a fibrous filler with a resinous syrup of a condensate of formaldehyde and melamine;
  (B) drying the combined material from (A); and
  (C) adding and homogenizing with the dried material of (B) from about 1 to 50 percent by weight, based on the total weight of the molding composition, of a composition prepared by the steps of:
    (a) combining a fibrous filler with a resinous syrup of a condensate of formaldehyde and melamine,
    (b) drying the combined material from (a),
    (c) curing at an elevated temperature and pulverizing the composition obtained from (b); and
  (D) molding the composition resulting from step (C) at elevated temperatures and pressures.

8. The molded article in claim 7 wherein the composition in step (c) is cured by molding at a temperature of from about 250° to 375° F. and at a pressure of from about 1400 to 4000 p.s.i.

9. The molded article in claim 8 wherein the composition in step (c) is ground to a particle size of less than 250 microns.

10. The molded article in claim 9 wherein the molding operation in step (D) is carried out at a temperature of from about 250° to 375° F. and at a pressure of from about 1400 to 4000 p.s.i.

References Cited
UNITED STATES PATENTS
3,557,031   1/1971   Standish et al. _____ 260—17.3

WILLIAM H. SHORT, Primary Examiner

E. WOODBERRY, Assistant Examiner